(12) United States Patent
Tripp (10) Patent No.: US 9,522,430 B2
(45) Date of Patent: Dec. 20, 2016

(54) MOULDING FOR BUILDING EXTERIOR AND MACHINE FOR CUTTING SAME

(71) Applicant: Scott Tripp, Oshawa (CA)

(72) Inventor: Scott Tripp, Oshawa (CA)

( * ) Notice: Subject to any disclaimer, the term of this patent is extended or adjusted under 35 U.S.C. 154(b) by 196 days.

(21) Appl. No.: 13/999,176

(22) Filed: Jan. 24, 2014

(65) Prior Publication Data

US 2014/0190325 A1 Jul. 10, 2014

Related U.S. Application Data

(60) Continuation-in-part of application No. 13/573,301, filed on Sep. 10, 2012, now abandoned, which is a division of application No. 12/458,280, filed on Jul. 7, 2009, now Pat. No. 8,286,404.

(51) Int. Cl.
| | |
|---|---|
| *B23D 19/04* | (2006.01) |
| *B23D 23/02* | (2006.01) |
| *E04D 13/158* | (2006.01) |
| *E04F 21/00* | (2006.01) |
| *E04F 19/04* | (2006.01) |

(52) U.S. Cl.
CPC ............... *B23D 19/04* (2013.01); *B23D 23/02* (2013.01); *E04D 13/158* (2013.01); *E04F 21/0069* (2013.01); *E04F 19/0436* (2013.01); *E04F 2019/0413* (2013.01); *Y10T 29/49789* (2015.01); *Y10T 83/783* (2015.04)

(58) Field of Classification Search
CPC ....... B23D 23/02; B23D 19/04; E04D 13/158; Y10T 83/783; Y10T 29/49789; E04F 21/0069; E04F 19/0436; E04F 2019/0413

USPC .................................................... 83/500–503
See application file for complete search history.

(56) References Cited

U.S. PATENT DOCUMENTS

| | | | |
|---|---|---|---|
| 724,206 | A | 3/1903 | Robinson |
| 3,172,320 | A | 3/1965 | Talbot |
| 3,227,026 | A | 1/1966 | Werntz |
| 3,967,452 | A | 7/1976 | Maloney et al. |
| 3,994,055 | A | 11/1976 | Maloney et al. |
| 4,218,946 | A | 8/1980 | Witzler |
| 4,245,534 | A | 1/1981 | Van Cleave |
| 4,459,888 | A | 7/1984 | Frye |
| 4,660,399 | A * | 4/1987 | Suter ......................... B21D 5/08 72/129 |
| 5,357,719 | A | 10/1994 | Lewis |
| 5,393,294 | A | 2/1995 | Jobst |
| 5,457,877 | A * | 10/1995 | McDermott ......... H02G 1/1239 29/426.4 |
| 5,560,158 | A | 10/1996 | Norton |
| 5,791,222 | A * | 8/1998 | Micouleau ............. B23D 23/00 269/232 |
| 6,151,836 | A | 11/2000 | McGlothlin et al. |
| 6,230,600 | B1 | 5/2001 | Stroud |

(Continued)

*Primary Examiner* — Keneth E. Peterson
*Assistant Examiner* — Nhat Chieu Do
(74) *Attorney, Agent, or Firm* — Young & Thompson (57) ABSTRACT

A machine for cutting eavestrough into two segments. The machine has a guide plate and a pair of cutting wheels. The guide plate has an opening of a shape similar to that of the cross-section of the eavestrough but slightly larger so that as the eavestrough is fed through the opening, it is guided by the guide plate. The cutting wheels are positioned such that after the eavestrough exits from the opening, its bottom wall passes between the wheels where it is cut.

6 Claims, 6 Drawing Sheets

(56) References Cited

U.S. PATENT DOCUMENTS

| | | |
|---|---|---|
| 6,539,675 B1 | 4/2003 | Gile |
| 6,837,020 B1 | 1/2005 | Keddell |
| 6,874,398 B2 | 4/2005 | Binggeli |
| 7,036,282 B1 | 5/2006 | Keddell |
| 7,334,369 B2 | 2/2008 | Carson |
| 7,975,582 B1 * | 7/2011 | Coon .................... B23D 19/04 30/265 |
| 8,286,404 B2 | 10/2012 | Tripp |
| 2003/0121162 A1 * | 7/2003 | So ........................... B67B 7/34 30/417 |
| 2004/0173069 A1 | 9/2004 | Shoudai et al. |
| 2006/0248805 A1 * | 11/2006 | Gentry ................. E04D 13/076 52/14 |
| 2007/0137276 A1 * | 6/2007 | Meyer .................... B21D 5/08 72/178 |
| 2009/0246559 A1 | 10/2009 | Ishiguro |
| 2010/0005741 A1 | 1/2010 | Tripp |
| 2011/0126681 A1 * | 6/2011 | Blanchet ................ B26D 1/24 83/51 |

* cited by examiner

MOULDING FOR BUILDING EXTERIOR AND MACHINE FOR CUTTING SAME

CROSS-REFERENCE TO RELATED PRIOR APPLICATIONS

This application is a continuation-in-part of application Ser. No. 13/573,301, filed Sep. 10, 2012, which is a divisional of application Ser. No. 12/458,280, filed Jul. 7, 2009, now U.S. Pat. No. 8,286,404, which application claims priority pursuant to 35 USC 119 of Canadian application No. 2,637,132, filed Jul. 9, 2008. Each of the recited priority applications are herein incorporated by reference in their entirety.

FIELD OF INVENTION

This invention relates to moulding disposed beneath the roof, windows and doors of a building and more particularly to an apparatus for forming moulding composed of a length of eavestrough.

BACKGROUND OF THE INVENTION

A common feature of many buildings is a decorative crown moulding disposed beneath its eaves. The moulding is referred to variously as colonial trim, Victorian trim, and frieze board depending on its design. The moulding is manufactured specifically for use as moulding and is generally relatively expensive.

I have invented moulding which is formed from lengths of eavestroughs. The means for forming the moulding is simple and straightforward and once formed, the moulding can be easily installed on the exterior of a building. The cost of such moulding is significantly less than that of conventional moulding yet is attractive and, like conventional moulding, enhances the appearance of a building. I have also invented a cutting machine for forming lengths of eavestrough into such moulding.

SUMMARY OF THE INVENTION

Briefly, the method of forming the moulding on the exterior of a building includes the following steps; first a longitudinally extending cut is formed in the bottom wall of a conventional eavestrough in order to separate the eavestrough into outer and inner segments. The outer segment is composed of the front wall and an outer portion of the bottom wall of the eavestrough while the inner segment is composed of the back wall of the eavestrough and a remaining inner portion of the bottom wall. The inner portion of the bottom wall is then positioned beneath the eaves or elsewhere on the exterior surface of a building such that the back wall projects outwardly from the exterior surface. The front wall of the eavestrough is then hung from the projecting end of the back wall so that it extends downwardly and inwardly toward the exterior surface of the building.

The apparatus for cutting the eavestrough includes a housing; a guide plate; and a pair of cutting wheels rotatably mounted to the housing. The guide plate has an opening of a shape similar to that of the cross-section of the eavestrough and is sufficiently large to permit the eavestrough to pass through it. However the opening is not large enough to permit significant lateral movement of the eavestrough. The cutting wheels are rotatable about parallel axes and each wheel has an outer cylindrical surface, oppositely facing side surfaces and a circular cutting edge at the intersection of the cylindrical surface and one of the side surfaces. The cutting wheels are positioned such that after the eavestrough exits from the opening in the guide plate, its bottom wall passes between the cutting edges with resulting formation of an elongated cut in the bottom wall.

DESCRIPTION OF THE DRAWINGS

The moulding, the method of forming the moulding and the cutting apparatus of my invention are described with reference to the accompanying drawings in which.

Like reference characters refer to like parts throughout the description of the drawings.

DESCRIPTION OF PREFERRED EMBODIMENTS

Figure 1:
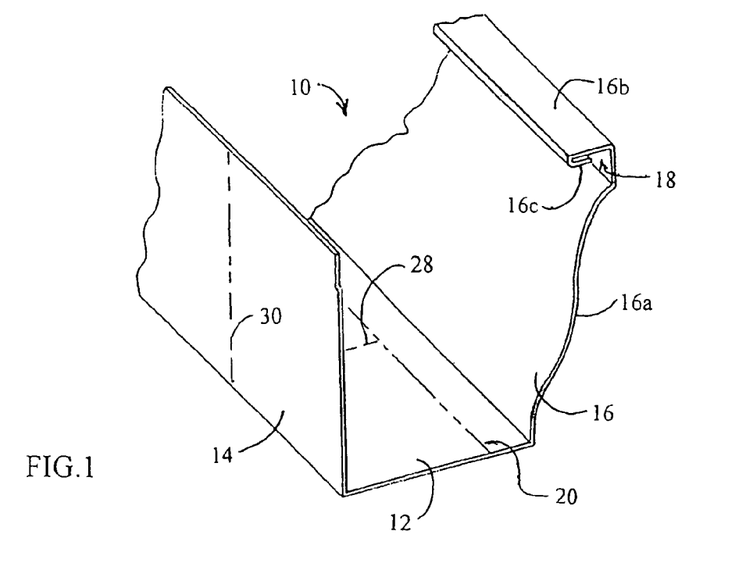
FIG. 1 is a perspective view of a conventional eavestrough or gutter and the location of cuts in it for forming the subject moulding.

With reference to FIG. 1, a conventional eavestrough or gutter, generally 10, has a bottom wall 12 and spaced apart upstanding back and front walls 14, 16., respectively. The front wall is visible from the exterior of the building and is usually provided with one or more curves 16a for aesthetic reasons. The upper portion of the front wall is folded inward at 16b and terminates at an upper edge or lip which is folded back on itself to form a loop 16c. The loop has an open mouth, generally 18 along the length of the front wall.

The back wall 14 of the eavestrough is usually nailed to a fascia of a building and is flat to ensure that it can be nailed or screwed firmly in place.

Figure 2:
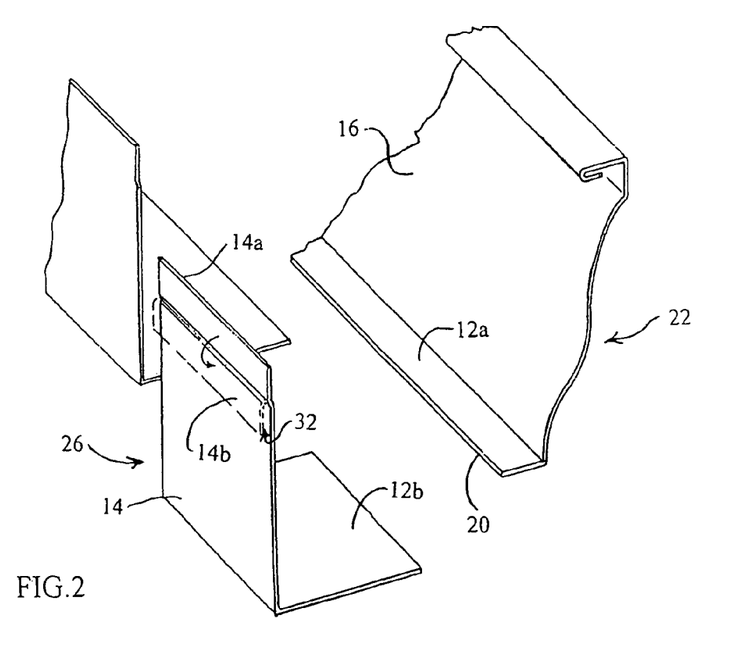
FIG. 2 is a perspective view of the eavestrough of FIG. 1 after it has been cut.

With reference to FIGS. 1 and 2, the bottom wall has a longitudinal cut 20 which separates the eavestrough into two segments, an outer segment, generally 22 which is composed of the front wall 16 and an outer cut portion 12a of the bottom wall and an inner segment, generally 26 which is composed of the back wall 14 and the remaining portion or inner cut portion 12b of the bottom wall.

The inner segment 26 can optionally be severed into one or more relatively short pieces by means of horizontal and vertical cuts 28, 30 respectively. The upper edge or lip 14a of the back wall is folded back on itself to form a loop 14b. Like loop 16c, loop 14b has an open mouth, generally 32 along the length of the back wall.

The inner segment of the eavestrough is attached beneath the eaves of a building and projects outwardly from an exterior wall of the building. The outer segment is attached to the projecting end of the inner segment and the two segments combine to form the moulding of the invention. The inner segment can also be attached beneath the windowsills or lintels of a building. The steps for attaching the inner segment beneath the eaves is described with reference to FIGS. 3 to 5. The same steps are followed when the inner segment is attached beneath the windowsills or lintels.

Figure 3:
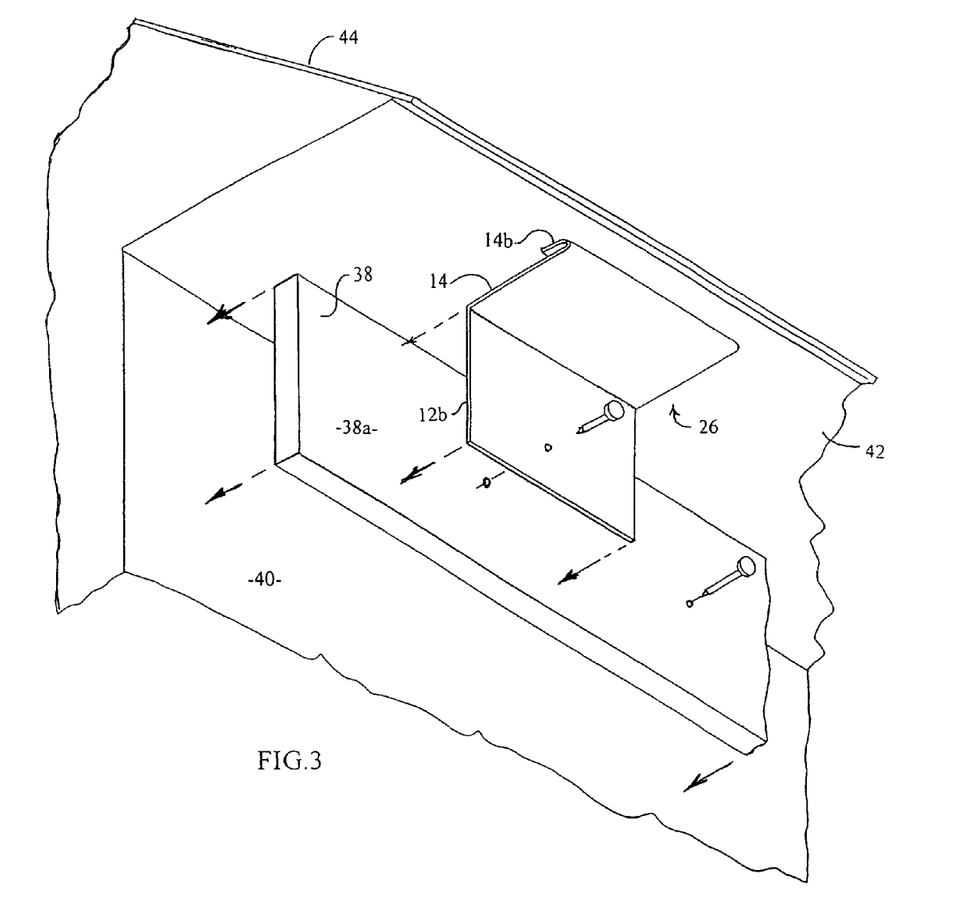
FIG. 3 is a perspective view of one segment of the eavestrough illustrated in FIG. 2 in conjunction with eaves of a building.

With reference first to FIG. 3, a panel 38 is first attached to the fascia 40 beneath the eaves 42 of an overhanging roof 44. The panel can be attached to the fascia by conventional means such as nails or screws. The inner segment 26 of the eavestrough is then rotated one quarter turn from the position illustrated in FIGS. 1 and 2 so that its inner cut portion 12b is adjacent to the front face 38a of the panel and its back wall 14 projects outward from the panel.

Figure 4:
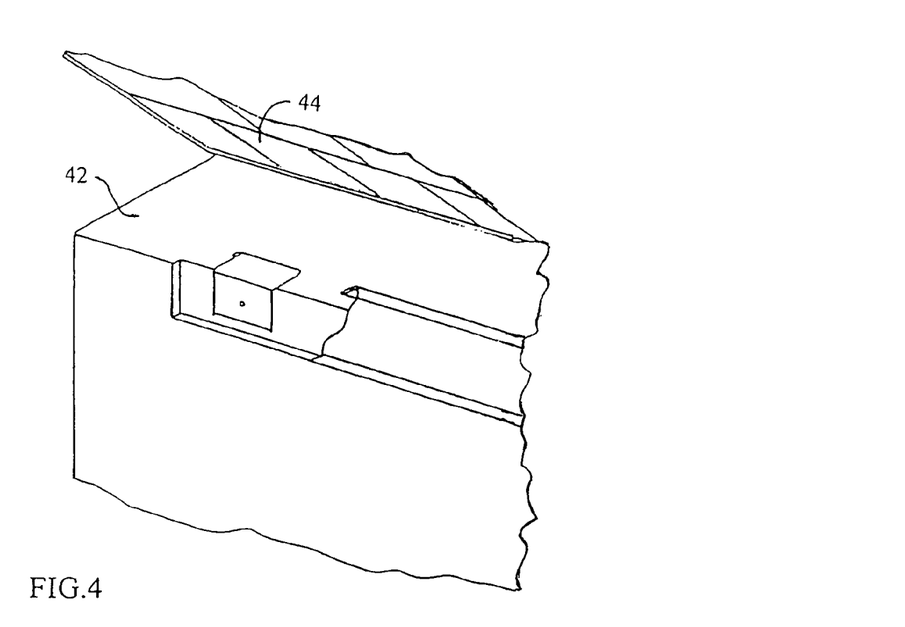
FIG. 4 is a perspective view of all the segments illustrated in FIG. 2 in conjunction with the eaves and overhanging roof of a building.
Figure 5:
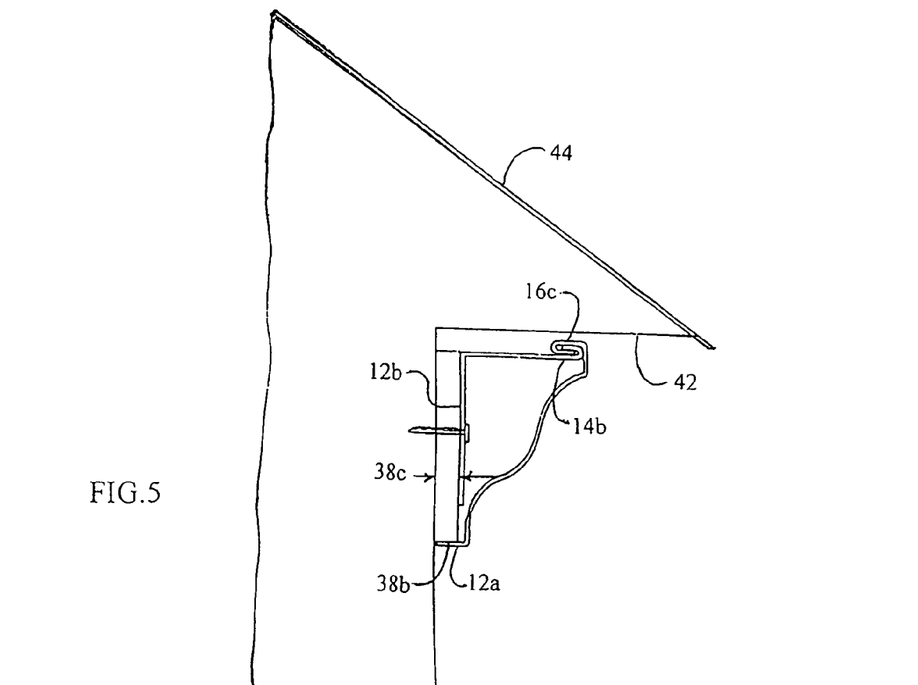
FIG. 5 is an side elevation of the segments of the eavestrough illustrated in FIG. 4.

With reference to FIGS. 4 and 5, the outer segment is then attached to the inner segment by fitting loop 16c into loop 14b. The front wall of the outer segment will then extend downward and cover the inner segment and the panel. The inner cut portion 12b should then be moved up or down on the panel until the outer cut portion 12a is adjacent to the lower edge 38b of the panel. The inner cut portion 12b is then attached to the panel by nails or screws after which the outer cut portion 12a is attached to the lower edge of the panel in order to immobilize the outer segment.

As illustrated in FIGS. 1 and 5, the longitudinal cut 20 made in the bottom wall of the eavestrough should be such that the width of the outer cut portion 12a is slightly greater than the thickness 38c of the panel. The outer segment will then completely cover the panel.

Figures 6, 7:
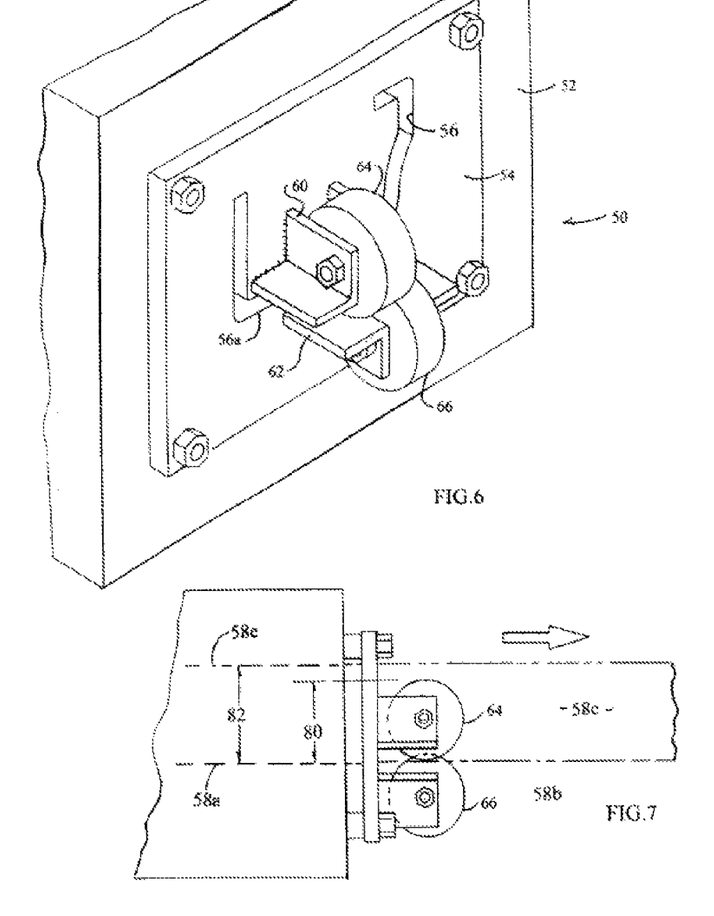
FIG. 6 is a perspective of the machine for cutting the eavestrough.
FIG. 7 is a side elevation of the cutting machine together with a length of eavestrough in phantom lines.
Figure 8:
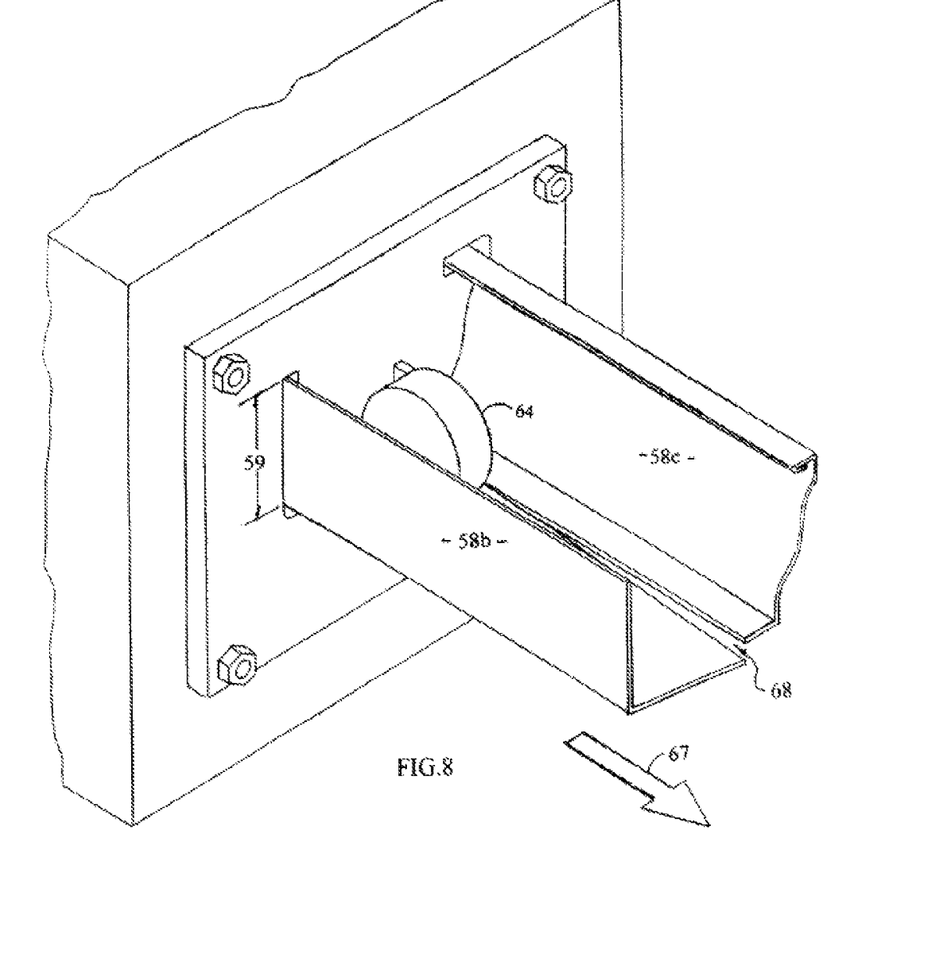
FIG. 8 is a perspective view of the cutting machine in conjunction with a portion of an eavestrough.

With reference to FIGS. 6-8, the cutting machine of the invention, generally 50, includes housing 52 to which a guide plate 54 is bolted. An opening, generally 56 for sliding receipt of the eavestrough is formed in the guide plate. The entire opening is formed permanently and immovably in the guide plate. The opening is of a shape similar to that of the cross-section of the eavestrough but is slightly larger so that the eavestrough will advance through the opening with minimal lateral movement as it does so.

Figure 9:
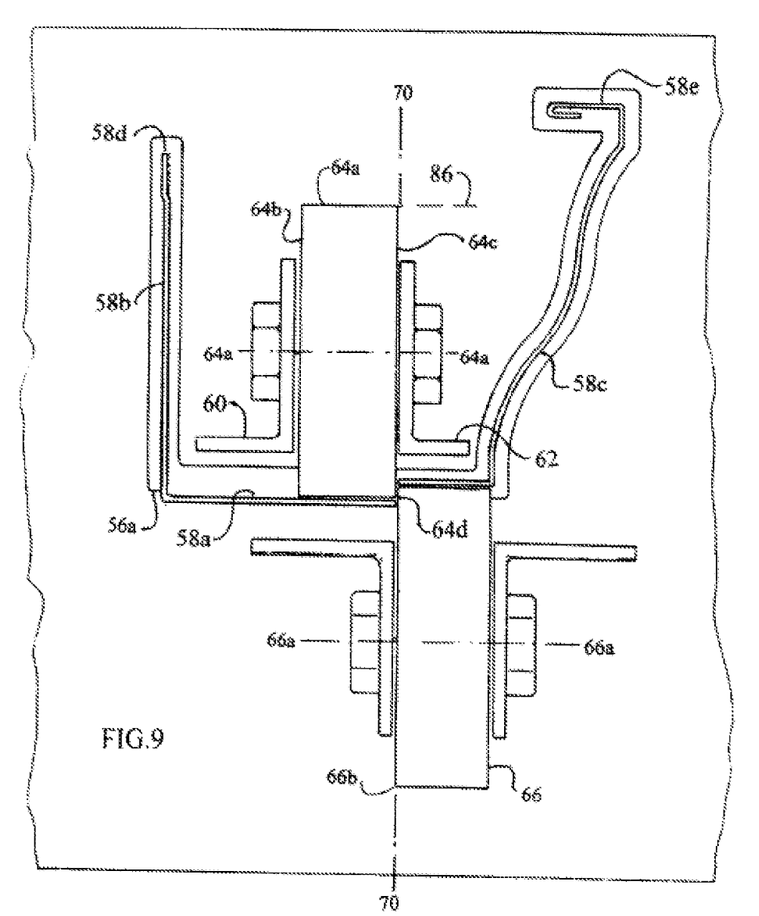
FIG. 9 is a front elevation of the cutting machine and a cross-section of an eavestrough.

With reference to FIG. 9, the eavestrough has a bottom wall 58a and inner and outer side walls 58b,c respectively which extend upward from the bottom wall and terminate at inner and outer upper limits 58d,e. The two side walls may be different shapes, as they are in that Figure and may be of equal or unequal lengths.

The length of the side walls between the bottom wall to their upper limits, measured vertically as indicated by the number 59 in FIG. 8, will of course not be the same and the shape of the opening in the guide plate through which the eavestrough travels will reflect the differences.

With reference to FIGS. 8 and 9, two vertically spaced brackets 60, 62 are attached to the front wall of the guide plate and a separate cutting wheel 64, 66 is rotatably attached to each bracket. The wheels rotate about axes 64a-64a, 66a-66a which are spaced vertically apart and which are parallel to each other and to the bottom portion 56a of the opening which admits the bottom wall of the eavestrough Cutting wheel 64 has an outer cylindrical surface 64a oppositely facing side surfaces 64b,c and a circular cutting edge 64d at the intersection of the cylindrical surface 64a and side surface 64c. Cutting wheel 66 has an identical shape or construction. The cutting wheels are positioned such that as the eavestrough advances downstream in the direction of arrow 67 into contact with the wheels, its bottom wall passes between cutting edges 64d and 66b with resulting formation of a longitudinally extending cut 68 in its bottom wall.

The cutting wheels are positioned such that cutting wheel 64 is above the bottom wall of the eavestrough while cutting wheel 66 is below the bottom wall. The cutting edges 64d, 66b lie in the same imaginary plane 70-70.

An eavestrough is usually formed from a flat sheet of aluminum at the site where the structure to which the eavestrough is to be attached is located. At the site, the sheet is placed on drive rollers which propel the sheet forward first into a conventional forming or so called "gutter" machine in which the sheet is bent into the required shape. Continuing under the propulsion of the drive rollers, the shaped sheet then travels to a length-cutting station where it is cut to the required length. Cutting may be carried out by a conventional guillotine or it may be cut simply by hand by means of tin snips, shears or other conventional means. The cutting machine of the invention is inserted into the path of travel upstream of the length-cutting station. Preferably the cutting machine is attached integrally with the gutter machine.

The cutting wheels are mounted to rotate independently of each other and are caused to rotate solely by friction between the cutting wheels and the bottom wall of the eavestrough as it passes between the cutting wheels. The drive rollers are the sole means of propulsion of the eavestrough through the cutting machine and the sole means for causing the cutting wheels to rotate.

Eavestroughs are usually composed of aluminum for many reasons. It is lightweight for ease of installation, it is relatively strong and does not fracture when struck as does plastic. It is also relatively inexpensive and it is flexible. However being flexible it is apt to bend out of shape as it travels from the gutter machine to the length-cutting station. For that reason the space between the gutter machine and the length-cutting station is conventionally kept to a minimum. The subject cutting machine being located between the gutter machine and the length-cutting machine necessarily lengthens that space but the space can be minimized by providing cutting wheels of small diameter in the subject cutting machine. The smaller the diameter of the wheels, the shorter the path through the machine.

In regard to the cutting wheels, and with reference to FIG. 7, the diameter 80 of upper cutting wheel 64 is less than the height 82 of the outer side wall 58c of the eavestrough measured vertically from the bottom wall 58a to its upper limit 58e. The outer side wall is usually the longer of the two side walls of the eavestrough but if it is not then the radius should be less than height of the inner side wall 58b.

Alternatively, and with reference to FIG. 9, the outer cylindrical wall 64a of the upper cutting wheel at its uppermost level 86 is beneath the level of whichever upper limit 58d,e of the eavestrough is the higher as the bottom wall of the eavestrough advances between the cutting wheels.

It will be understood of course, that modifications can be made in the cutting machine of my invention without departing from the scope and purview of the invention as defined in the appended claims.

I claim:

1. A cutting machine for cutting a bottom wall of an eavestrough having a pair of upstanding side walls which extend upwardly from said bottom wall and terminate at upper limits, said cutting machine comprising:
   a guide plate having a downstream side;
   a pair of cutting wheels; and
   a pair of brackets fastened to said downstream side of said guide plate, each of said cutting wheels being rotatably mounted to a respective one of the brackets, said guide plate having an opening of a shape that conforms to a shape of a cross-section of said eavestrough and having a size that permits said eavestrough to advance with minimal lateral movement thereof from an upstream side of said guide plate, the entire opening being formed permanently and immovably in the guide plate, through said opening to the downstream side of said guide plate, said pair of cutting wheels being rotatable about parallel axes spaced vertically apart such that one of said cutting wheels is disposed above the other of said cutting wheels, said pair of cutting wheels being positioned to contact said bottom wall as said eavestrough exits from said guide plate with resulting formation of an elongated longitudinally extending cut in said bottom wall, said pair of cutting wheels being caused to rotate solely by friction between said pair of cutting wheels and said bottom wall as said eavestrough advances between said pair of cutting wheels, wherein said opening includes a bottom portion configured to receive the bottom wall of said eavestrough, one of said cutting wheels being disposed above the level of said bottom portion and the other of said cutting wheels being disposed beneath the level of said bottom portion.

2. The cutting machine of claim 1, wherein a diameter of each said cutting wheels is less than the height of said eavestrough measured vertically from said bottom wall to whichever of said inner and outer limit is higher.

3. The cutting machine of claim 1, wherein each of said cutting wheels has an outer cylindrical surface, oppositely facing side surfaces and a circular cutting edge at an intersection of said cylindrical surface and one of said side surfaces, said pair of cutting wheels being positioned such that after said eavestrough advances through said opening, said bottom wall passes between said cutting edges.

4. The cutting machine of claim 1, wherein an outer cylindrical surface of said upper cutting wheel at an uppermost level thereof is located beneath the level of whichever of said upper limits is higher as said bottom wall advances between said pair of cutting wheels.

5. The cutting machine of claim 4, further comprising lower and upper oppositely facing elongated surface,
  wherein the bottom wall of said eavestrough is defined by the lower and upper oppositely facing elongated surfaces, said cutting wheels being positioned such that the cylindrical surface of one of said cutting wheels contacts said lower elongated surface while cylindrical surfaces of the other of said cutting wheels contacts the upper elongated surface.

6. The cutting machine of claim 5, wherein cutting edges of both said cutting wheels lie in a same imaginary plane.

* * * * *